(12) United States Patent
Sambhav et al.

(10) Patent No.: US 11,739,655 B2
(45) Date of Patent: Aug. 29, 2023

(54) VARIABLE NOZZLE DEVICE AND VARIABLE-DISPLACEMENT TYPE EXHAUST TURBOCHARGER

(71) Applicant: MITSUBISHI HEAVY INDUSTRIES ENGINE & TURBOCHARGER, LTD., Sagamihara (JP)

(72) Inventors: Jain Sambhav, Sagamihara (JP); Yosuke Danmoto, Sagamihara (JP); Youji Akiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 105 days.

(21) Appl. No.: 17/608,893

(22) PCT Filed: Jun. 26, 2019

(86) PCT No.: PCT/JP2019/025333
§ 371 (c)(1),
(2) Date: Nov. 4, 2021

(87) PCT Pub. No.: WO2020/261417
PCT Pub. Date: Dec. 30, 2020

(65) Prior Publication Data
US 2022/0316356 A1    Oct. 6, 2022

(51) Int. Cl.
*F01D 17/16*        (2006.01)
(52) U.S. Cl.
CPC ........ *F01D 17/165* (2013.01); *F05D 2220/40* (2013.01); *F05D 2240/128* (2013.01); *F05D 2260/50* (2013.01)
(58) Field of Classification Search
CPC .............. F01D 17/165; F05D 2220/40; F05D 2240/128; F05D 2260/50; F05D 2250/90; F05D 2260/56; F02B 37/24
See application file for complete search history.

(56) References Cited

U.S. PATENT DOCUMENTS

2011/0138805 A1* 6/2011 Barthelet ............. F01D 17/165
                                                               415/164

FOREIGN PATENT DOCUMENTS

JP         2017-180462 A      10/2017

OTHER PUBLICATIONS

International Search Report, issued in PCT/JP2019/025333, dated Sep. 17, 2019.

(Continued)

*Primary Examiner* — Mickey H France
*Assistant Examiner* — Edward Bushard
(74) *Attorney, Agent, or Firm* — Birch, Stewart, Kolasch & Birch, LLP

(57) ABSTRACT

A variable nozzle device includes: a nozzle mount; a plurality of nozzle vanes; a drive ring being having a plurality of receiving portions disposed at different positions along a circumferential direction; and a plurality of lever plates each having a fixed portion to be fixed to corresponding one of the plurality of nozzle vanes and an engaging portion to be engaged with corresponding one of the plurality of receiving portions of the drive ring. The receiving portions include a first-side guide surface and a second-side guide surface. The engaging portions each include a first-side roll surface which is to be in contact with the first-side guide surface and a second-side roll surface which is to be in contact with the second-side guide surface. The first-side roll surface includes a lever-plate-side linear portion extending linearly in at least a part of a range which is to be in contact with the first-side guide surface. The first-side guide surface includes a drive-ring-side protruding curved surface portion extending in a protruding curve shape in at least a part of a range which is to be in contact with the first-side roll surface.

8 Claims, 12 Drawing Sheets

(56) References Cited

OTHER PUBLICATIONS

Written Opinion of the International Searching Authority, issued in PCT/JP2019/025333, dated Sep. 17, 2019.

\* cited by examiner

VARIABLE NOZZLE DEVICE AND VARIABLE-DISPLACEMENT TYPE EXHAUST TURBOCHARGER

TECHNICAL FIELD

The present disclosure relates to a variable nozzle device configured such that the vane angle of the nozzle vane is variable, and a variable-geometry type exhaust turbocharger having the variable nozzle device.

BACKGROUND ART

Typically, a variable-geometry type exhaust turbocharger is known as an exhaust turbocharger which supercharges intake air of an engine by utilizing energy of exhaust gas of the engine (see Patent Document 1, for instance). A variable-geometry type exhaust turbocharger adjusts the cross-sectional area of a nozzle flow passage which sends exhaust gas to a turbine wheel from a scroll flow passage of a turbine casing to change the flow velocity and the pressure of the exhaust gas to be sent to the turbine wheel, thereby enhancing the supercharging effect.

Patent Document 1 discloses a variable nozzle device which includes a lever plate (arm) having a shaft-supported end coupled integrally to a nozzle vane via a support shaft and a free end to be engaged with a groove formed on a drive ring (unison ring). The above lever plate includes: a close-side protruding curved surface to be in contact with a close-side groove wall surface formed linearly upon rotation of the drive ring in the closing direction to reduce the cross-sectional area of the nozzle flow passage; and an open-side protruding curved surface to be in contact with an open-side groove wall surface disposed parallel to the close-side groove wall surface upon rotation of the drive ring in the opening direction to increase the cross-sectional area of the nozzle flow passage.

CITATION LIST

Patent Literature

Patent Document 1: JP2017-180462A

SUMMARY

Problems to be Solved

Patent Document 1 discloses providing the lever plate of the variable nozzle device with a close-side protruding curved surface and an open-side protruding curved surface, thereby reducing the stress at the engagement portion between the lever plate and the drive ring and reducing wear at the engagement portion. However, it is required for the variable nozzle device to reduce wear at the engagement portion even more, in order to stabilize the position accuracy of the nozzle vane for a long period of time.

In view of the above, an object of at least one embodiment of the present invention is to provide a variable nozzle device which can suppress wear at the engagement portion where the lever plate and the drive ring engage with one another.

Solution to the Problems (1) According to at least one embodiment of the present invention, a variable nozzle device includes: a nozzle mount; a plurality of nozzle vanes supported rotatably on the nozzle mount; a drive ring being disposed rotatably about an axis of the nozzle mount and having a plurality of receiving portions disposed at different positions along a circumferential direction; and a plurality of lever plates each having a fixed portion to be fixed to corresponding one of the plurality of nozzle vanes and an engaging portion to be engaged with corresponding one of the plurality of receiving portions of the drive ring. The receiving portions each include a first-side guide surface and a second-side guide surface. The engaging portions each include a first-side roll surface which is to be in contact with the first-side guide surface and a second-side roll surface which is to be in contact with the second-side guide surface. The first-side roll surface includes a lever-plate-side linear portion extending linearly in at least a part of a range which is to be in contact with the first-side guide surface. The first-side guide surface includes a drive-ring-side protruding curved surface portion extending in a protruding curve shape in at least a part of a range which is to be in contact with the first-side roll surface.

With the above configuration (1), the lever plate has the lever-plate-side linear portion extending linearly, and the drive ring has the drive-ring-side protruding curved surface portion extending in the shape of a protruding curve. Herein, the turning radius of the drive ring is greater than the turning radius of the lever plate, and thus it is possible to provide the drive-ring-side protruding curved surface portion with a protruding curved surface portion having a milder shape, compared to a case where the drive ring has a linear portion which extends linearly and the lever plate has a protruding curved surface portion which extends in the shape of a protruding curved surface. With the drive-ring-side protruding curved surface portion having a mild shape, it is possible to reduce the stress applied to the contact area between the lever plate and the drive ring. By reducing the stress applied to the contact area, it is possible to suppress wear of the engagement portion between the lever plate and the drive ring.

(2) In some embodiments, in the variable-nozzle device described in the above (1), the lever-plate-side linear portion is configured to extend along a longitudinal-direction axis of the lever plate.

With the above configuration (2), the lever-plate-side linear portion extends along the longitudinal-direction axis of the lever plate, and thus it is possible to reduce stress applied to the contact area between the lever plate and the drive ring. Thus, it is possible to suppress wear of the lever plate.

(3) In some embodiments, in the variable-nozzle device described in the above (2), the drive-ring-side protruding curved surface portion is configured such that a distance to a tangent to a limit contact position at a radially outer side in a range which is to be in contact with the first-side roll surface gradually increases toward a radially inner side.

With the above configuration (3), the drive-ring-side protruding curved surface portion is configured such that the distance to the tangent to the limit contact position at the radially outer side in the range which makes contact with the first-side roll surface gradually increases toward the radially inner side. In this case, when the drive ring rotates toward the first side in the circumferential direction, the contact area of the drive-ring-side protruding curved surface portion with respect to the first-side roll surface (including the lever-plate-side linear portion) moves toward the radially inner side, the same direction as the contact area of the first-side roll surface with respect to the drive-ring-side protruding curved surface portion. Thus, it is possible to reduce the friction drag at the contact area between the drive-ring-side protruding curved surface portion and the first-side roll surface. By reducing the friction drag at the contact area, it is possible to suppress wear of the engagement portion between the lever plate and the drive ring.

(4) In some embodiments, in the variable-nozzle device described in any one of the above (1) to (3), the second-side guide surface includes a drive-ring-side linear portion extending linearly in a range which is to be in contact with the second-side roll surface, and the second-side roll surface includes a lever-plate-side protruding curved surface portion extending in a protruding curve shape in a range which is to be in contact with the second-side guide surface.

When the clearance at the engagement portion between the lever plate and the drive ring is large, the engaging portion of the lever plate rocks and moves considerably due to vibration and collides repeatedly with the receiving portion of the drive ring, and thus it is desirable to reduce the size of the clearance of the engagement portion. With the above configuration (4), the lever plate has the lever-plate-side linear portion at the first side, and the lever-plate-side protruding curved surface portion at the second side. The drive ring has the drive-ring-side protruding curved surface portion at the first side, and the drive-ring-side linear portion at the second side. In this case, it is possible to reduce the maximum value of the clearance of the engagement portion between the lever plate and the drive ring in the entire range of rotation of the drive ring, compared to a case in which the lever plate has a linear portion at each of the first side and the second side and the drive ring has a protruding curved surface portion at each of the first side and the second side. With the above configuration, it is possible to reduce the maximum value of the clearance of the engagement portion, and thus it is possible to suppress wear of the engagement portion due to vibration.

(5) In some embodiments, in the variable-nozzle device described in the above (4), the drive-ring-side linear portion is oblique such that a distance to a longitudinal-direction axis of the lever plate is shorter at a radially outer side than at a radially inner side, and the lever-plate-side protruding curved surface portion is configured such that a distance to a tangent to a limit contact position at the radially outer side in a range which is to be in contact with the second-side guide surface gradually increases toward the radially inner side.

With the above configuration (5), the drive-ring-side linear portion is oblique such that the distance to the longitudinal-direction axis is shorter at the radially outer side than at the radially inner side. Furthermore, the lever-plate-side protruding curved surface portion is configured such that the distance to the tangent to the limit contact position at the radially outer side in the range which makes contact with the second-side guide surface gradually increases toward the radially inner side. In this case, when the drive ring rotates toward the second side in the circumferential direction, the contact area of the lever-plate-side protruding curved surface portion with respect to the second-side guide surface (including the drive-ring-side linear portion) moves toward the radially inner side, the same direction as the contact area of the second-side guide surface with respect to the lever-plate-side protruding curved surface portion. Thus, it is possible to reduce the friction drag at the contact area between the lever-plate-side protruding curved surface portion and the first-side roll surface. By reducing the friction drag at the contact area, it is possible to suppress wear of the engagement portion between the lever plate and the drive ring.

(6) In some embodiments, in the variable-nozzle device described in any one of the above (1) to (5), the first-side roll surface includes an inner protruding curved surface portion continuing to a radially inner side with respect to the lever-plate-side linear portion, the inner protruding curved surface portion extending in a protruding curve shape in a range which is to be in contact with the first-side guide surface. The inner protruding curved surface portion is configured such that a distance to a longitudinal-direction axis of the lever plate gradually decreases toward a radially inner side.

With the above configuration (6), the first-side roll surface further includes the above described lever-plate-side linear portion, and the inner protruding curved surface portion which continues to the radially inner side with respect to the above described lever-plate-side linear portion and which extends in the shape of a protruding curved shape in the range which contacts the first-side guide surface. The inner protruding curved surface portion is configured such that the distance to the longitudinal-direction axis of the lever plate gradually decreases toward the radially inner side. Thus, the drive-ring-side protruding curved surface portion makes contact with the lever-plate-side linear portion and the inner protruding curved surface portion upon rotation of the drive ring. In this case, it is possible to provide the drive-ring-side protruding curved surface portion with a milder shape compared to a case in which the first-side roll surface includes only the lever-plate-side linear portion. With the drive-ring-side protruding curved surface portion having a milder shape, it is possible to reduce the stress applied to the contact area between the lever plate and the drive ring, and thereby suppress wear of the engagement portion between the lever plate and the drive ring.

(7) In some embodiments, in the variable-nozzle device described in any one of the above (1) to (6), the first-side guide surface and the first-side roll surface are each configured to be in contact with one another upon rotation of the drive ring in a closing direction.

When the drive ring is rotated in the closing direction, the nozzle vane reduces the flow-passage cross-sectional area of the nozzle flow passage, which increases the pressure applied to the nozzle vane from exhaust gas flowing through the nozzle flow passage. Thus, a larger stress is applied to the contact area between the lever plate and the drive ring compared to that in rotation of the drive ring in the opening direction. With the above configuration (7), the first-side guide surface and the first-side roll surface are each configured to make contact with one another upon rotation of the drive ring in the closing direction. In this case, it is possible to reduce the stress applied to the contact area upon rotation of the drive ring in the closing direction, which is the rotational direction that applies a great stress to the contact area, and thus it is possible to effectively suppress wear of the engagement portion.

(8) According to at least one embodiment of the present invention, a variable-geometry type exhaust turbocharger includes a variable nozzle device according to any one of the above (1) to (7).

With the above configuration (8), the lever plate has the lever-plate-side linear portion extending linearly, and the drive ring has the drive-ring-side protruding curved surface portion extending in the shape of a protruding curve. Thus, it is possible to suppress wear of the engagement portion between the lever plate and the drive ring. By suppressing wear of the engagement portion between the lever plate and the drive ring, it is possible to operate the nozzle vane accurately for a long period of time, and thus the variable-geometry type exhaust turbocharger can regulate the supercharge pressure of combustion gas supplied to the engine accurately for a long period of time.

Advantageous Effects

According to at least one embodiment of the present invention, it is possible to provide a variable nozzle device which can suppress wear at the engaging portion where the lever plate and the drive ring engage with one another.

DETAILED DESCRIPTION

Figure 1:
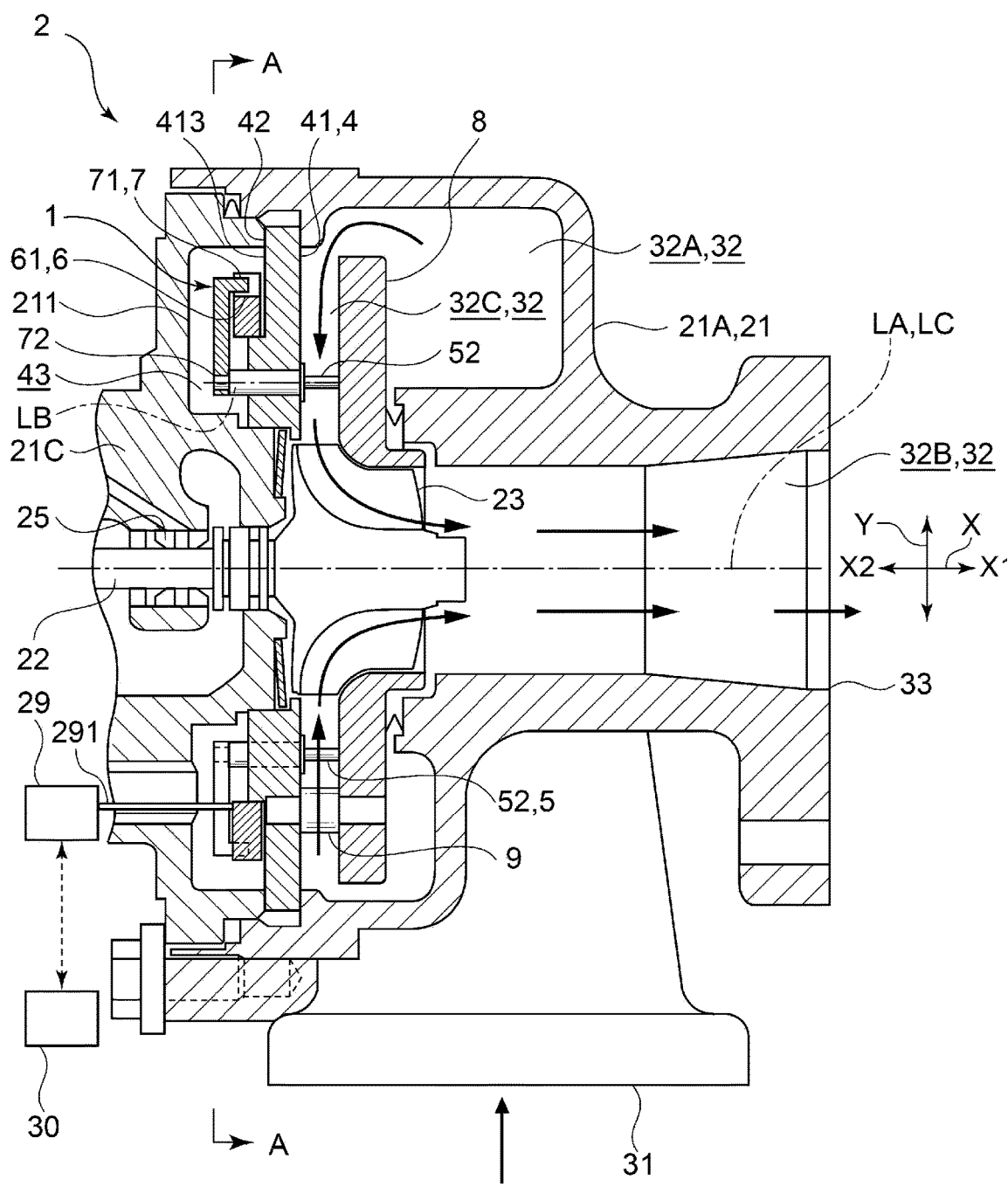
FIG. 1 is a cross-sectional view schematically showing a variable-geometry type exhaust turbocharger including a variable nozzle device according to an embodiment of the present invention.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features may be indicated by the same reference numerals and not described in detail.

Figure 2:
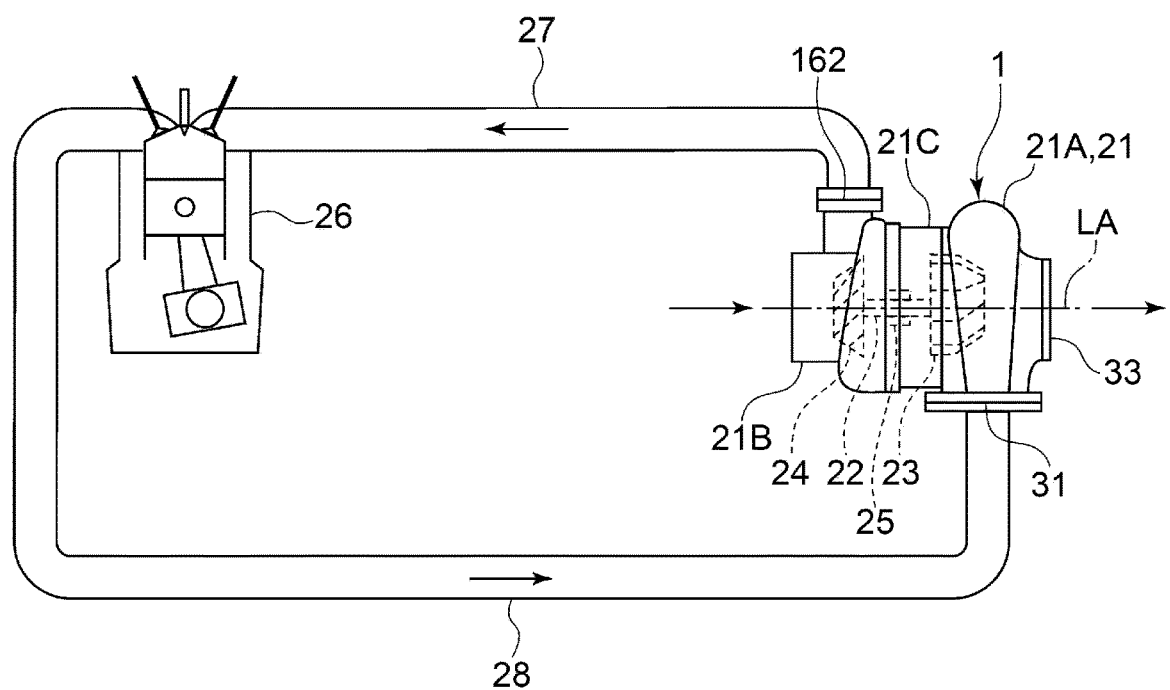
FIG. 2 is a schematic diagram schematically showing a configuration of an engine including a variable-geometry type exhaust turbocharger according to an embodiment of the present invention.
Figure 3:
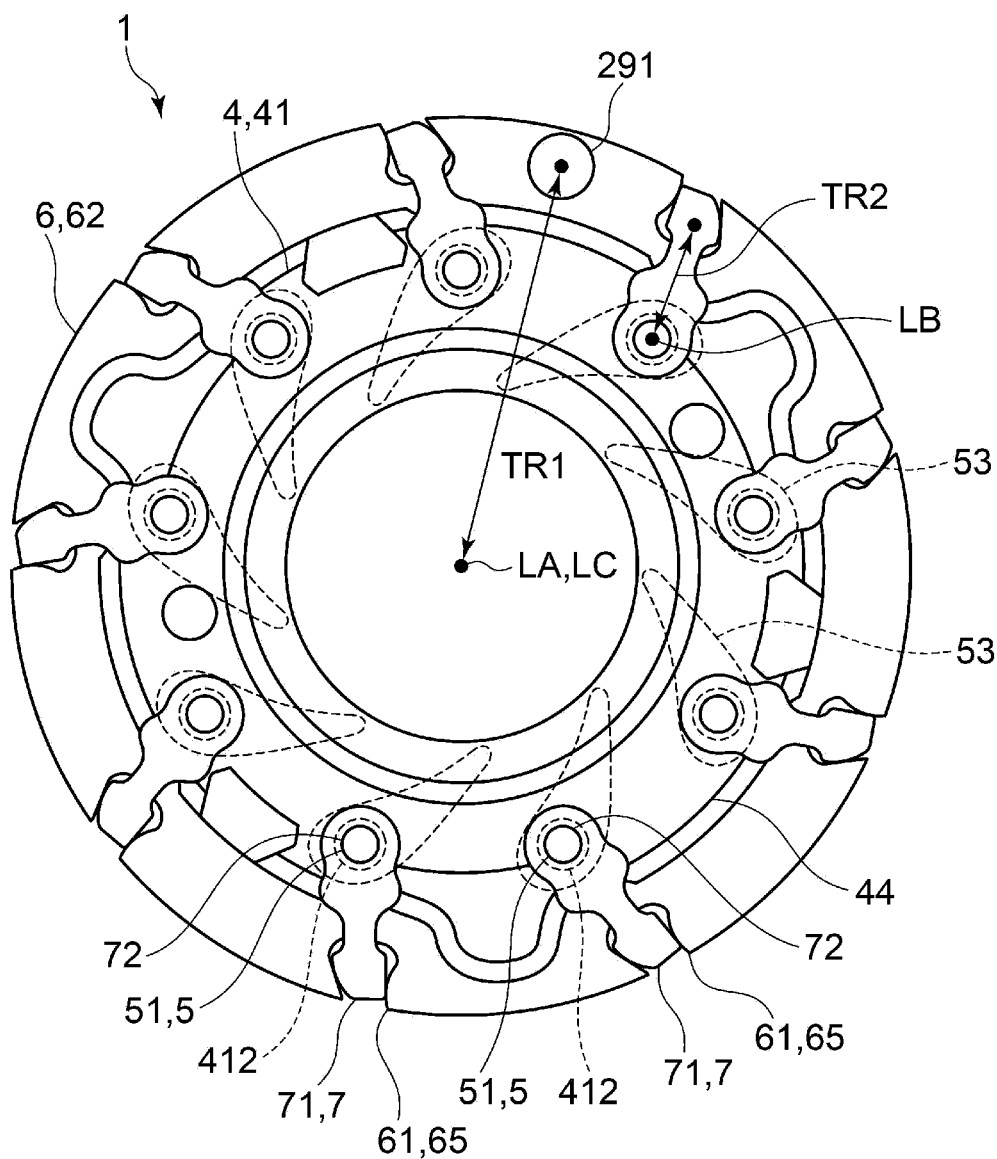
FIG. 3 is a schematic cross-sectional view taken along line A-A in FIG. 1.
Figure 4:
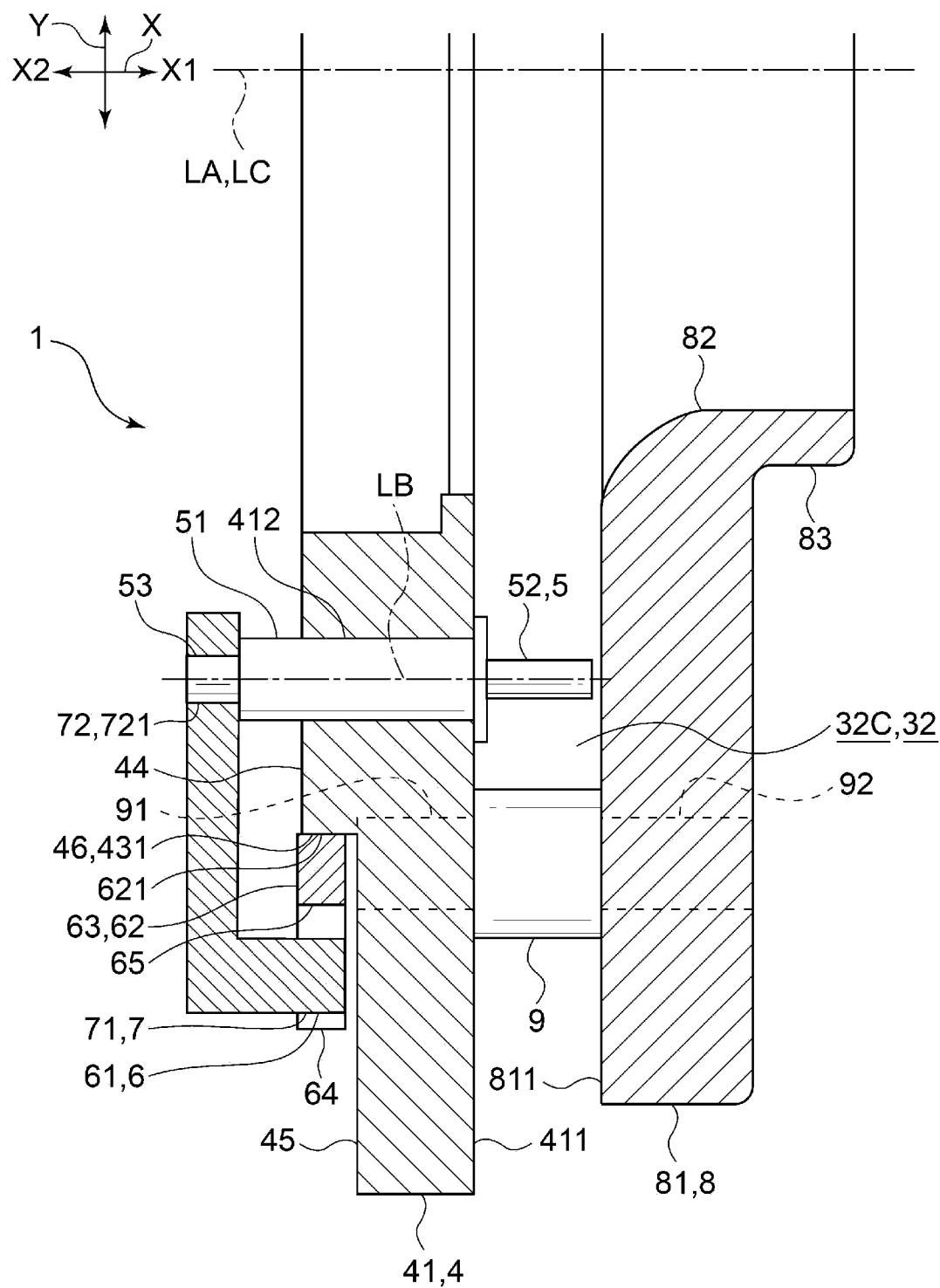
FIG. 4 is a cross-sectional view of a variable nozzle device.

FIG. 1 is a cross-sectional view schematically showing a variable-geometry type exhaust turbocharger including a variable nozzle device according to an embodiment of the present invention. FIG. 2 is a schematic diagram schematically showing a configuration of an engine including a variable-geometry type exhaust turbocharger according to an embodiment of the present invention. FIG. 3 is a schematic cross-sectional view taken along line A-A in FIG. 1. FIG. 4 is a cross-sectional view of a variable nozzle device.

As depicted in FIG. 1, the variable nozzle device 1 according to some embodiments is mounted inside a housing 21 of an exhaust turbocharger 2. In the illustrated embodiment, the variable nozzle device 1 is mounted inside an assembly of a turbine housing 21A and a bearing housing 21C assembled together.

As depicted in FIG. 2, the exhaust turbocharger 2 (variable-geometry type exhaust turbocharger) according to some embodiments includes a rotational shaft 22, a turbine wheel 23 mechanically coupled to an end portion of the rotational shaft 22, a compressor rotor 24 mechanically coupled to the other end portion of the rotational shaft 22, a bearing 25 which supports the rotational shaft 22 rotatably, and the above described housing 21 accommodating the above.

In the illustrated embodiment, the housing 21 includes the turbine housing 21A housing the turbine wheel 23, a compressor housing 21B housing the compressor rotor 24, and the bearing housing 21C housing the bearing 25. The bearing housing 21C is disposed between the turbine housing 21A and the compressor housing 21B, and is fastened to each of the turbine housing 21A and the compressor housing 21B via a fastening member such as a bolt.

As depicted in FIG. 2, the compressor rotor 24 is disposed in a supply line 27 for supplying air (combustion gas) to an engine body 26 (combustion device). The turbine wheel 23 is disposed in a discharge line 28 for discharging exhaust gas from the engine body 26.

As depicted in FIG. 2, the exhaust turbocharger 2 is configured to rotate the turbine wheel 23 with exhaust gas introduced into the turbine housing 21A through the discharge line 28 from the engine body 26. The compressor rotor 24 is mechanically coupled to the turbine wheel 23 via the rotational shaft 22, and thus rotates in conjunction with rotation of the turbine wheel 23. The exhaust turbocharger 2 is configured to rotate the compressor rotor 24 to compress air (combustion gas) introduced into the compressor housing 21B, and send the compressed air to the engine body 26 through the supply line 27.

As depicted in FIG. 1 for instance, the turbine housing 21A includes a scroll flow passage 32A and an exhaust gas discharge flow passage 32B formed therein. The scroll flow passage 32A is an exhaust gas flow passage 32 having a scroll shape for sending exhaust gas introduced into the turbine housing 21A from an exhaust gas introduction port 31 to the turbine wheel 23, and the exhaust gas discharge flow passage 32B is an exhaust gas flow passage 32 for sending exhaust gas from the turbine wheel 23 to an exhaust gas discharge port 33.

Hereinafter, as depicted in FIG. 1 for instance, the direction of extension of the axis LA of the variable nozzle device 1 will be referred to as the axial direction X, and the direction orthogonal to the axis LA will be referred to as the radial direction Y. Of the axial direction X, the side where the turbine housing 21A is positioned with respect to the bearing housing 21C (the right side in FIG. 1) will be referred to the first side X1, and the side where the bearing housing 21C is positioned with respect to the turbine housing 21A (the left side in FIG. 1) will be referred to as the second side X2. In the illustrated embodiment, the axis LA of the variable nozzle device 1 extends coaxially with the axis of the turbine wheel 23.

As depicted in FIG. 1, the variable nozzle device 1 is disposed at the radially outer side of the turbine wheel 23 so as to surround the periphery of the turbine wheel 23. The variable nozzle device 1 is configured to define a nozzle flow passage 32C which is an exhaust gas flow passage 32, between the scroll flow passage 32A and the turbine wheel 23. Furthermore, the variable nozzle device 1 is configured to be capable of adjusting the cross-sectional area of the nozzle flow passage 32C by changing the vane angle of the vane 52 of the nozzle vane 5. By increasing and decreasing the cross-sectional area of the nozzle flow passage 32C, it is possible to change the flow velocity and pressure of exhaust gas flowing from the scroll flow passage 32A to the turbine wheel 23.

The exhaust gas introduced into the turbine housing 21A from the exhaust gas introduction port 31 passes through the scroll flow passage 32A, then through the nozzle flow passage 32C, and is sent to the turbine wheel 23 to rotate the turbine wheel 23. The exhaust gas after rotating the turbine wheel 23 passes through the exhaust gas discharge flow passage 32B, and then is discharged outside the turbine housing 21A from the exhaust gas discharge port 33.

As depicted in FIG. 1, the variable nozzle device 1 includes a nozzle mount 4. The nozzle mount 4 includes an annular plate portion 41 which extends along the direction intersecting with (orthogonal to) the axis LA. The nozzle mount 4 is configured to be supported inside the housing 21.

In the illustrated embodiment, as depicted in FIG. 1, the nozzle mount 4 is configured such that the outer peripheral edge portion 42 of the annular plate portion 41 is interposed between the turbine housing 21A and the bearing housing 21C, and thereby the nozzle mount 4 is supported inside the housing 21. With the nozzle mount 4 being supported inside the housing 21, the variable nozzle device 1 is supported inside the housing 21. The back surface 413 at the second side of, in the axial direction, of the annular plate portion 41 of the nozzle mount 4 and a groove portion 211 having an annular shape formed on the bearing housing 21C define an internal space 43 inside thereof.

In the illustrated embodiment, the variable nozzle device 1 includes, as depicted in FIG. 1 for instance, the above described nozzle mount 4, at least one nozzle vane 5, a drive ring 6, at least one lever plate 7, a nozzle plate 8, and at least one nozzle support 9. As depicted in FIG. 1, the drive ring 6 and the lever plate 7 are disposed inside the internal space 43.

As depicted in FIG. 4, the nozzle plate 8 includes a plate-side annular plate portion 81 extending along a direction intersecting with (orthogonal to) the axis LA, and a protruding portion 83 protruding toward the first side in the axial direction from the inner peripheral edge portion 82 of the plate-side annular plate portion 81.

As depicted in FIG. 4, the at least one nozzle support 9 is configured to support the nozzle plate 8 so as to be separate from the nozzle mount 4. In the illustrated embodiment, the nozzle support 9 has a longitudinal direction, and the first end portion 91 in the longitudinal direction is mechanically coupled to the annular plate portion 41 (nozzle mount 4), and the second end portion 92 in the longitudinal direction is mechanically coupled to the plate-side annular plate portion 81 (nozzle plate 8).

In an embodiment, the at least one nozzle support 9 includes a plurality of nozzle supports 9 arranged at intervals from one another along the circumferential direction about the axis LA. In this case, each one of the plurality of nozzle supports 9 is mechanically coupled to each of the nozzle mount 4 and the nozzle plate 8.

The above described nozzle flow passage 32C is, as depicted in FIG. 4, defined by the nozzle mount 4 and the nozzle plate 8. In the illustrated embodiment, the above described nozzle flow passage 32C is defined by a mount-side flow passage wall surface 411 positioned at the first side, in the axial direction, of the annular plate portion 41, and a plate-side flow passage wall surface 811 positioned at the second side, in the axial direction, of the plate-side annular plate portion 81. The plate-side flow passage wall surface 811 faces the mount-side flow passage wall surface 411.

As depicted in FIG. 4, the at least one nozzle vane 5 is supported rotatably on the nozzle mount 4. The at least one nozzle vane 5 includes a vane shaft 51 having a longitudinal direction, and a vane 52 disposed on an end portion, in the longitudinal direction, of the vane shaft 51. The vane 52 is disposed in the nozzle flow passage 32C, that is, between the nozzle mount 4 and the nozzle plate 8. In the illustrated embodiment, the vane shaft 51 is supported rotatably in an insertion hole 412 formed on the annular plate portion 41, and thereby the nozzle vane 5 is rotatable about the axis LB of the vane shaft 51.

In the illustrated embodiment, the at least one nozzle vane 5 includes a plurality of nozzle vanes 5, as depicted in FIG. 3. The same number of above described insertion holes 412 as the nozzle vanes 5 are formed. The respective insertion holes 412 are formed at positions separated from one another at intervals along the circumferential direction centered at the axis LA. Each of the plurality of nozzle vanes 5 is configured such that the vane shaft 51 is inserted through corresponding one of the plurality of insertion holes 412.

As depicted in FIG. 4, the drive ring 6 is disposed so as to be rotatable about the axis LC of the nozzle mount 4. The drive ring 6 includes at least one receiving-portion 61 formed to loosely engage with the engaging portion 71 of the lever plate 7 such that the engaging portion 71 is capable of rolling. The axis LC of the nozzle mount 4 extends along the axis LA of the variable nozzle device 1. In the illustrated embodiment, the axis LC extends coaxially with the axis LA.

In the illustrated embodiment, the annular plate portion 41 of the nozzle mount 4 includes, as depicted in FIG. 4, a radially inner portion 44 on which the above described insertion holes 412 are formed, and a radially outer portion 45 positioned at the radially outer side of the radially inner portion 44. The radially inner portion 44 has a larger thickness than the radially outer portion 45. The drive ring 6 includes a ring-side annular plate portion 62 which extends along the direction intersecting with (orthogonal to) the axis LA. The inner peripheral surface 621 of the ring-side annular plate portion 62 is positioned so as to face the step surface 431 formed at the boundary between the radially inner portion 44 and the radially outer portion 45 of the nozzle mount 4. The drive ring 6 is supported such that the radially inner end portion 63 of the ring-side annular plate portion 62 is rotatable with respect to the radially outer end portion 46 of the radially inner portion 44 of the nozzle mount 4.

Figure 5:
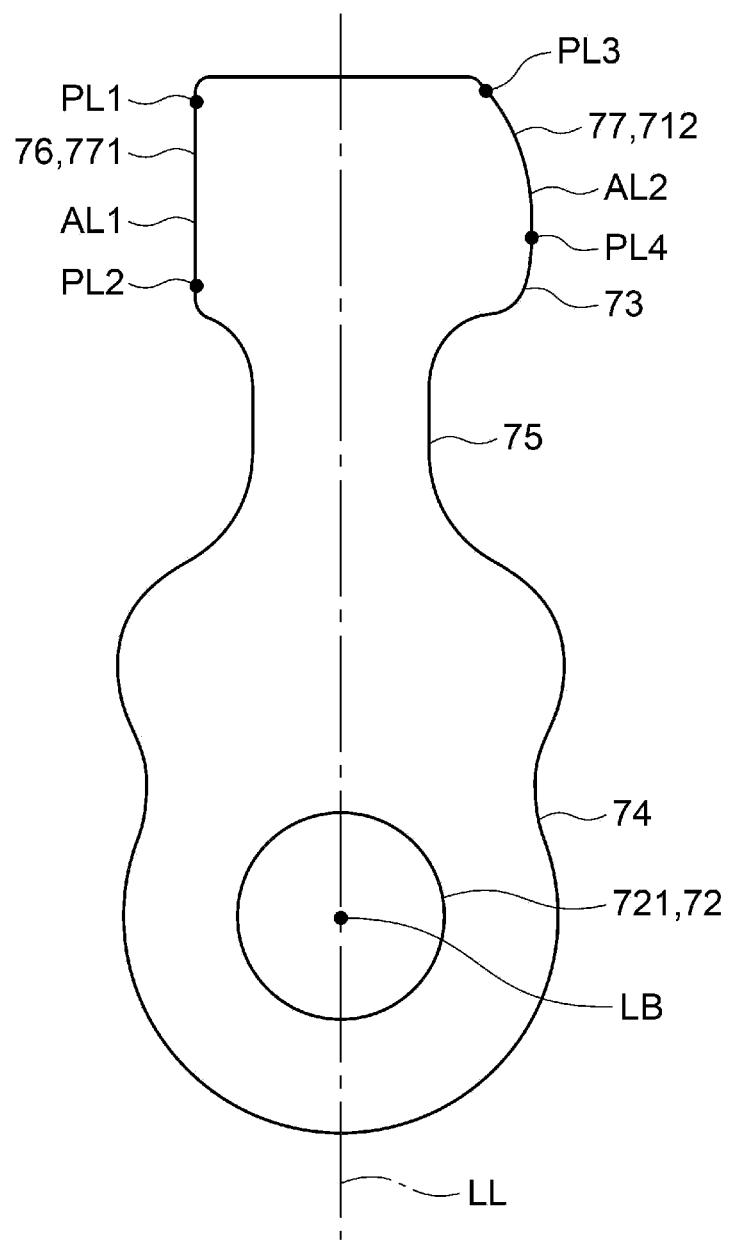
FIG. 5 is a schematic diagram of a lever plate according to the first embodiment of the present invention.

FIG. 5 is a schematic diagram of a lever plate according to an embodiment of the present invention.

The at least one lever plate 7 includes, as depicted in FIG. 4, the above described engaging portion 71 to be engaged with the receiving portion 61 of the drive ring 6, and a fixed portion 72 to be fixed to the nozzle vane 5. In the illustrated embodiment, as depicted in FIG. 5, the at least one lever plate 7 has a longitudinal direction along the longitudinal-direction axis LL of the lever plate 7. The lever plate 7 has the above described engaging portion 71 at the first end portion 73 in the longitudinal direction, and the above described fixed portion 72 at the second end portion 74 in the longitudinal direction. The lever plate 7 has a narrow width portion 75 having a narrower width than the first end portion 73 and the second end portion 74, between the first end portion 73 and the second end portion 74.

The longitudinal-direction axis LL is an axis along the longitudinal direction of the lever plate 7. The longitudinal-direction axis LL may be a design line which divides the second end portion 74 in the longitudinal direction symmetrically into right and left halves, or an area bisector line which bisects the area of the lever plate 7.

The fixed portion 72 of the lever plate 7 is, as depicted in FIG. 4, mechanically coupled to the vane shaft 51 o the nozzle vane 5. Thus, the vane 52 of the nozzle vane 5 and the lever plate 7 are integrally rotatable about the axis LB of the vane shaft 51.

In the illustrated embodiment, the vane shaft 51 of the nozzle vane 5 includes a first end portion 53 inserted through the insertion hole 412 of the nozzle mount 4, and protruding farther toward the second side in the axial direction from the radially inner portion 44. The fixed portion 72 of the lever plate 7 includes a through hole 721 coupled mechanically to the first end portion 53, with the first end portion 53 of the vane shaft 51 being fitted into the through hole 721.

In the illustrated embodiment, the receiving portion 61 of the drive ring 6 includes a groove portion 65 formed on the outer peripheral edge portion 64 of the ring-side annular plate portion 62. The engaging portion 71 of the lever plate 7 is housed inside the groove portion 65 and configured to loosely engage with the groove portion 65.

In the illustrated embodiment, the at least one lever plate 7 includes the same number of lever plates 7 as the nozzle vanes 5, as depicted in FIG. 3. Furthermore, the at least one receiving portion 61 of the drive ring 6 includes the same number of receiving portions 61 as the lever plates 7. The respective receiving portions 61 are formed at separate positions at intervals from one another along the circumferential direction about the axis LA. Each of the plurality of lever plates 7 is configured such that the fixed portion 72 is fixed to corresponding one of the plurality of nozzle vanes 5, and the engaging portion 71 engages with corresponding one of the plurality of receiving portions 61. Each of the plurality of lever plates 7 is arranged such that the engaging portion 71 is positioned at the radially outer side of the fixed portion 72.

In the illustrated embodiment, as depicted in FIG. 1, the exhaust turbocharger 2 includes an actuator 29 configured to rotate the drive ring 6 about the axis LC, and a controller 30 (control device) configured to control driving (traveling amount along the circumferential direction about the axis LC) of the drive shaft 291 of the actuator 29. The actuator 29 includes an electric motor and an air cylinder. The drive shaft 291 of the actuator 29 is mechanically coupled to the drive ring 6.

Along the power transmission path from the actuator 29 to the nozzle vane 5, the drive shaft 291 of the actuator 29 and the drive ring 6 are coupled to one another, the receiving portion 61 of the drive ring 6 and the engaging portion 71 of the lever plate 7 are coupled to one another, and the fixed portion 72 of the lever plate 7 and the vane shaft 51 of the nozzle vane 5 are coupled to one another.

When the controller 30 drives the actuator 29, the drive ring 6 is rotated about the axis LC accompanying movement of the drive shaft 291 of the actuator 29, and the plurality of lever plates 7 are rotated synchronously accompanying rotation of the drive ring 6.

As depicted in FIG. 3, when the drive ring 6 rotates toward the first side in the circumferential direction (clockwise direction in FIG. 3; closing direction), all of the lever plates 7 rotate toward the first side in the circumferential direction about the axis LB of the vane shaft 51. At this time, vanes 52 which are adjacent to one another in the circumferential direction move in directions to separate from one another. Accompanying the above movement of the vanes 52, the flow passage of exhaust gas between the vanes 52 adjacent in the circumferential direction, that is, the cross-sectional area of the nozzle flow passage 32C, increases. The rotational direction that increases the cross-sectional area of the nozzle flow passage 32C will be referred to as the closing direction.

As depicted in FIG. 3, when the drive ring 6 rotates toward the second side in the circumferential direction (clockwise direction in FIG. 3; opening direction), all of the lever plates 7 rotate toward the second side in the circumferential direction about the axis LB of the vane shaft 51. At this time, vanes 52 which are adjacent to one another in the circumferential direction move in directions to approach one another. Accompanying the above movement of the vanes 52, the flow passage of exhaust gas between the vanes 52 adjacent in the circumferential direction, that is, the cross-sectional area of the nozzle flow passage 32C, decreases. The rotational direction that reduces the cross-sectional area of the nozzle flow passage 32C will be referred to as the closing direction.

Furthermore, in some other embodiments, the drive ring 6 may be configured such that the cross-sectional area of the nozzle flow passage 32C decreases as the drive ring 6 rotates toward the first side in the circumferential direction, and the cross-sectional area of the nozzle flow passage 32C increases as the drive ring 6 rotates toward the second side in the circumferential direction.

Figure 6:
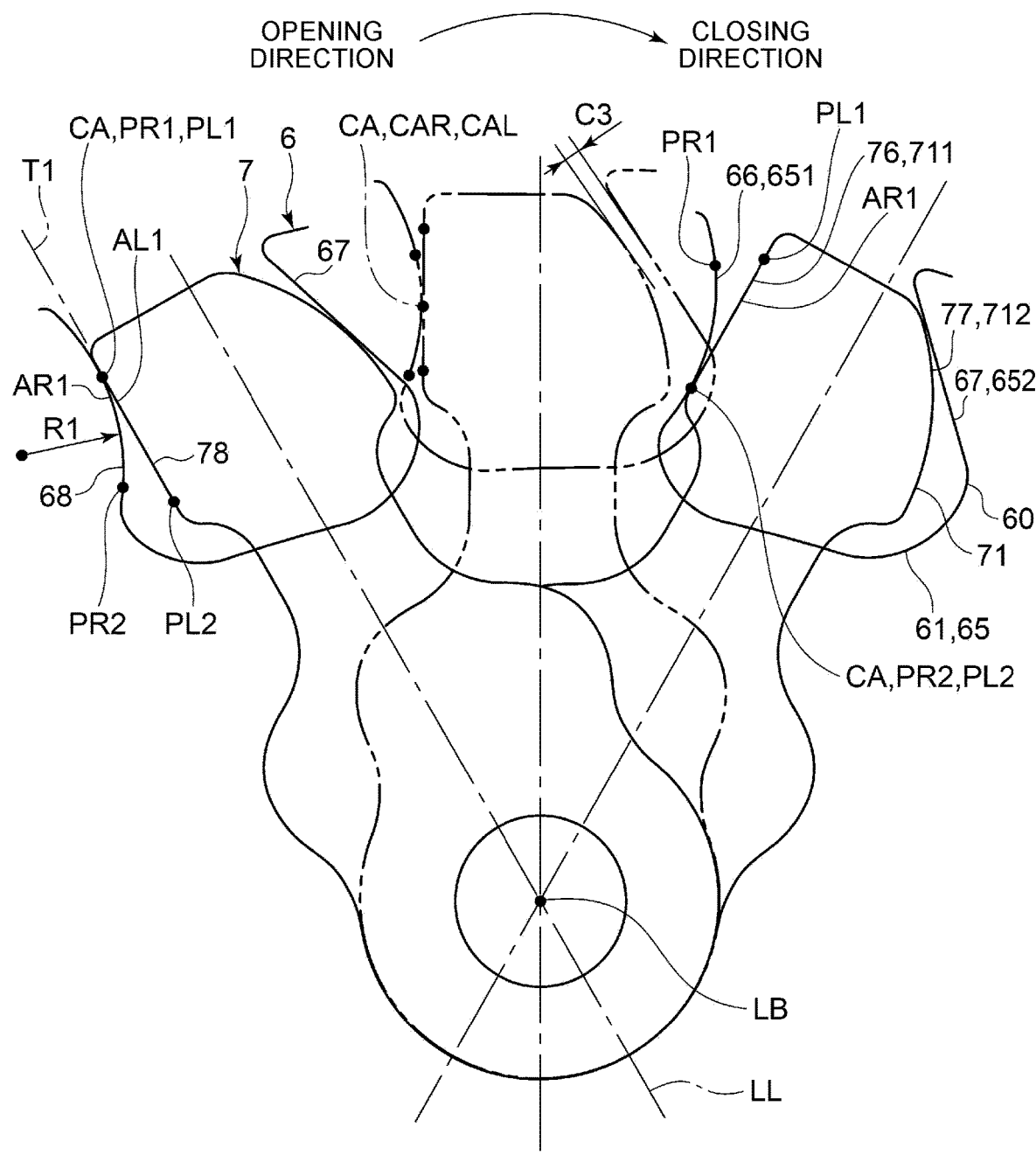
FIG. 6 is a schematic diagram for describing the relationship between a drive ring and a lever plate in the first embodiment of the present invention, for describing the contact area between the drive ring and the lever plate upon rotation of the drive ring in the closing direction.
Figure 7:
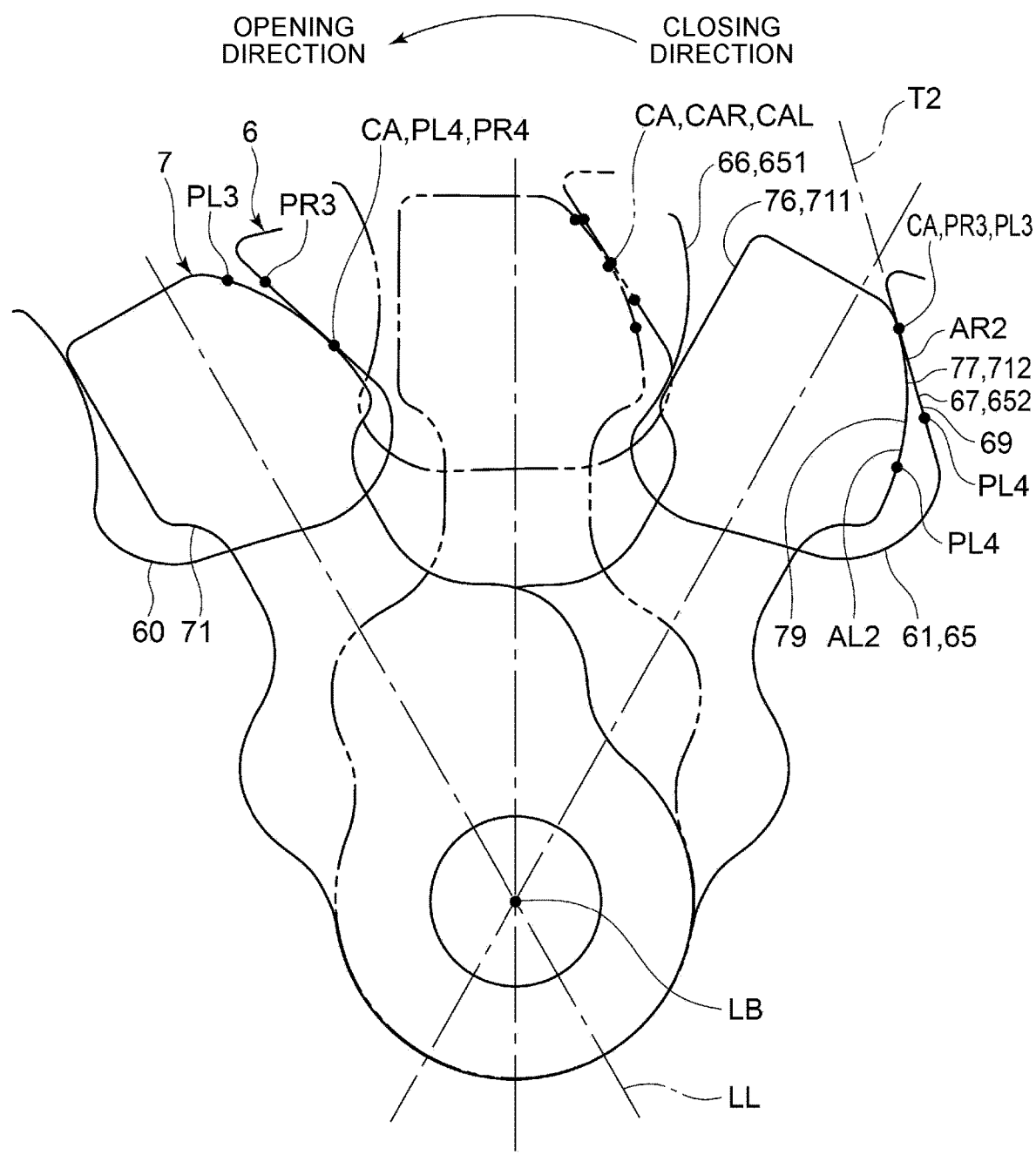
FIG. 7 is a schematic diagram for describing the relationship between a drive ring and a lever plate in the first embodiment of the present invention, for describing the contact area between the drive ring and the lever plate upon rotation of the drive ring in the opening direction.

FIG. 6 is a schematic diagram for describing the relationship between a drive ring and a lever plate in the first embodiment of the present invention, for describing the contact area between the drive ring and the lever plate upon rotation of the drive ring in the closing direction. FIG. 7 is a schematic diagram for describing the relationship between a drive ring and a lever plate in the first embodiment of the present invention, for describing the contact area between the drive ring and the lever plate upon rotation of the drive ring in the opening direction.

The receiving portion 61 of the drive ring 6 includes, as depicted in FIGS. 6 and 7, a first-side guide surface 66 and a second-side guide surface 67 which faces the first-side guide surface 66. In the illustrated embodiment, the first-side guide surface 66 includes a wall surface 651 at the second side, in the circumferential direction, of the above described groove portion 65, and the second-side guide surface 67 includes a wall surface 652 at the first side, in the circumferential direction, of the above described groove portion 65.

As depicted in FIGS. 6 and 7, the engaging portion 71 of the lever plate 7 rolls with respect to the receiving portion 61 of the drive ring 6 as the drive ring 6 rotates. That is, as the drive ring 6 rotates, the contact area CA between the drive ring 6 and the lever plate 7 moves gradually.

As depicted in FIGS. 6 and 7, the engaging portion 71 of the lever plate 7 includes a first-side roll surface 76 capable of being in contact with the first-side guide surface 66, and a second-side roll surface 77 capable of being in contact with the second-side guide surface 67. As depicted in FIG. 6, the first-side roll surface 76 makes contact with the first-side guide surface 66 when the drive ring 6 is rotating in the closing direction (toward the first side in the circumferential direction). As depicted in FIG. 7, the second-side roll surface 77 makes contact with the second-side guide surface 67 when the drive ring 6 is rotating in the opening direction (toward the second side in the circumferential direction). In the illustrated embodiment, the first-side roll surface 76 includes a first surface 711 of the above described engaging portion 71 (the surface at the second side in the circumferential direction), and the second-side roll surface 77 includes a second surface 712 disposed at the opposite side to the first surface 711 across the longitudinal-direction axis LL (the surface at the first side in the circumferential direction).

As depicted in FIG. 6, the first-side guide surface 66 of the drive ring 6 makes contact with the first-side roll surface 76 of the lever plate 7 in the range from the limit contact position PR1 at the radially outer side to the limit contact position PR2 at the radially inner side. The range of the first-side guide surface 66 which makes contact with the first-side roll surface 76 is referred to as AR1. The first-side roll surface 76 of the lever plate 7 makes contact with the first-side guide surface 66 of the drive ring 6 in the range from the limit contact position PL1 at the radially outer side to the limit contact position PL2 at the radially inner side. The range of the first-side roll surface 76 which makes contact with the first-side guide surface 66 is referred to as AL1.

As depicted in FIG. 6, when the drive ring 6 rotates in the closing direction (the first side in the circumferential direction), the contact area CA between the drive ring 6 and the lever plate 7 moves toward the radially inner side from the radially outer side. At this time, the contact area of the drive ring 6 with the lever plate 7 moves to the limit contact position PR2 toward the radially inner side from the limit contact position PR1. Furthermore, the contact area of the lever plate 7 with respect to the drive ring 6 moves to the limit contact position PL2 toward the radially inner side from the limit contact position PL1. That is, the respective contact areas CAR, CAL of the drive ring 6 and the lever plate 7 move in the same direction, toward the radially inner side.

As depicted in FIG. 7, the second-side guide surface 67 of the drive ring 6 makes contact with the second-side roll surface 77 of the lever plate 7 in the range from the limit contact position PR3 at the radially outer side to the limit contact position PR4 at the radially inner side. The range of the second-side guide surface 67 which makes contact with the second-side roll surface 77 is referred to as AR2. The second-side roll surface 77 of the lever plate 7 makes contact with the second-side guide surface 67 of the drive ring 6 in the range from the limit contact position PL3 at the radially outer side to the limit contact position PL4 at the radially inner side. The range of the second-side roll surface 77 which makes contact with the second-side guide surface 67 is referred to as AL2.

As depicted in FIG. 7, when the drive ring 6 rotates in the opening direction (the second side in the circumferential direction), the contact area CA between the drive ring 6 and the lever plate 7 moves toward the radially outer side from the radially inner side. At this time, the contact area of the drive ring 6 with respect to the lever plate 7 moves to the limit contact position PR3 toward the radially outer side from the limit contact position PR4. Furthermore, the contact area of the lever plate 7 with the drive ring 6 moves to the limit contact position PL3 toward the radially outer side from the limit contact position PL4. That is, the respective contact areas CAR, CAL of the drive ring 6 and the lever plate 7 move in the same direction, toward the radially outer side.

The variable nozzle device 1 according to some embodiments includes, as depicted in FIG. 6, the drive ring 6 including the above described receiving portion 61, and the lever plate 7 including the above described engaging portion 71. The receiving portion 61 includes the above described first-side guide surface 66 and the above described second-side guide surface 67, and the engaging portion 71 includes the above described first-side roll surface 76 and the above described second-side roll surface 77. The first-side roll surface 76 includes the lever-plate-side linear portion 78 extending linearly in at least a part of the range AL1 which makes contact with the first-side guide surface 66, and the first-side guide surface 66 includes a drive-ring-side protruding curved surface portion 68 which extends in the shape of a protruding curve in at least a part of the range AR1 which makes contact with the first-side roll surface 76.

In the illustrated embodiment, as depicted in FIG. 6, the lever-plate-side linear portion 78 extends linearly over the entire range of the above range AL1, and the drive-ring-side protruding curved surface portion 68 extends in the shape of a protruding curve over the entire range of the above range AR1. As depicted in FIG. 6, R1 is the radius (curvature radius) of an approximate circle approximate to the range AR1 of the drive-ring-side protruding curved surface portion 68.

Figure 8:
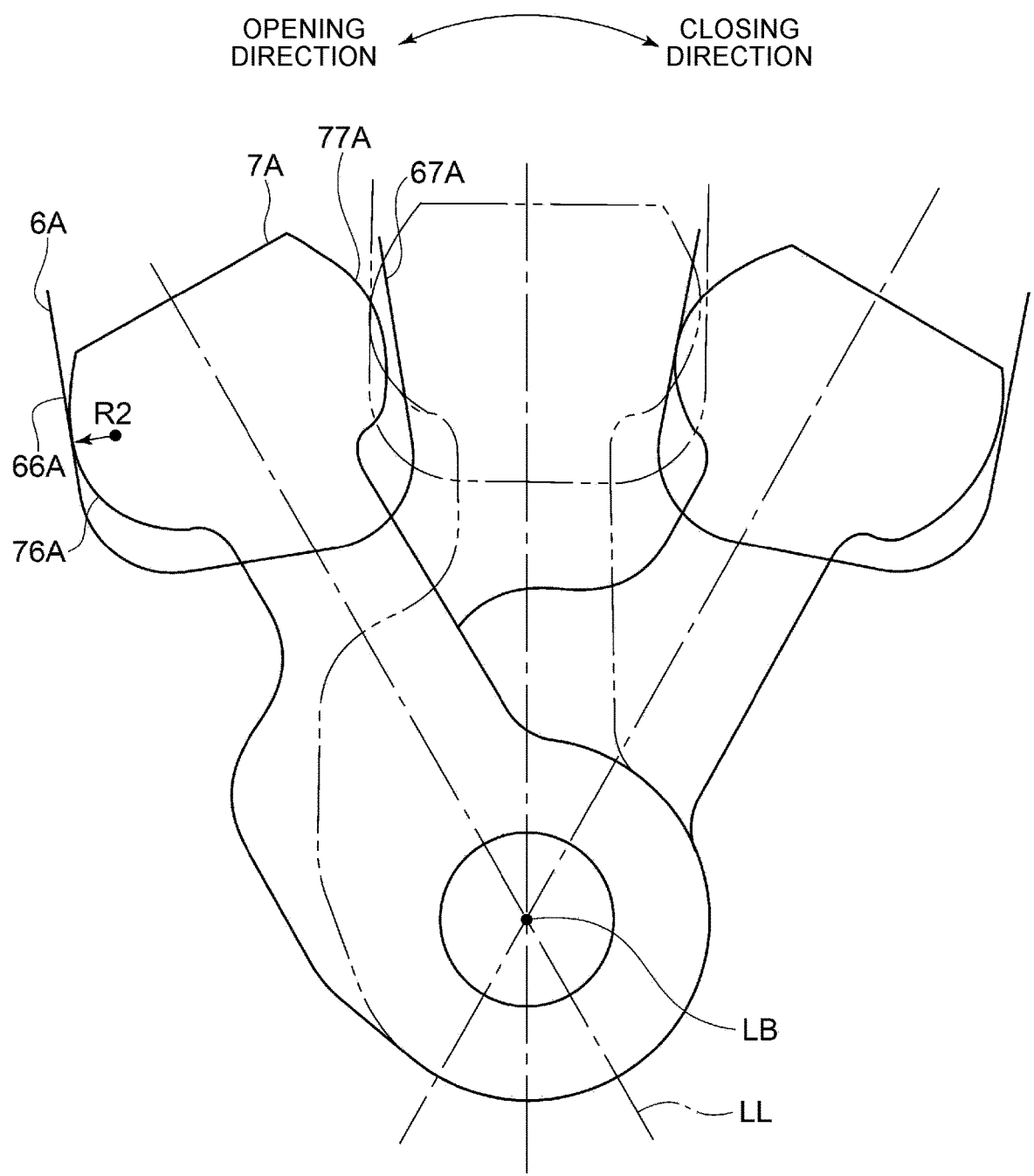
FIG. 8 is a schematic diagram for describing the relationship between a drive ring and a lever plate in a comparative example.

FIG. 8 is a schematic diagram for describing the relationship between a drive ring and a lever plate in a comparative example.

In the comparative example, the first-side guide surface 66A and the second-side guide surface 67A extend linearly. In the comparative example, the first-side roll surface 76A and the second-side roll surface 77A of the lever plate 7A each extend in the shape of a protruding curve. R2 is the radius (curvature radius) of an approximate circle approximate to the first-side roll surface 76A. The above radius R2 of the first-side roll surface 76A is smaller than the radius R1 of the above described drive-ring-side protruding curved surface portion 68. As depicted in FIG. 3, the turning radius TR1 of the drive ring 6 is greater than the turning radius TR2 of the lever plate 7, and thus the lever plate 7 rotates, when the drive ring 6 rotates by a predetermined angular degree about the axis LA, by a greater angular degree than the predetermined angular degree of the drive ring 6 about the axis LB. Thus, if the first-side roll surface 76A has a mild shape, the range of the first-side roll surface 76A which makes contact with the first-side guide surface 66A becomes greater than the above described range AR1, which may lead to deterioration of operation efficiency. Therefore, it is difficult for the first-side roll surface 76A to have a mild curved shape in terms of design.

Figure 9:
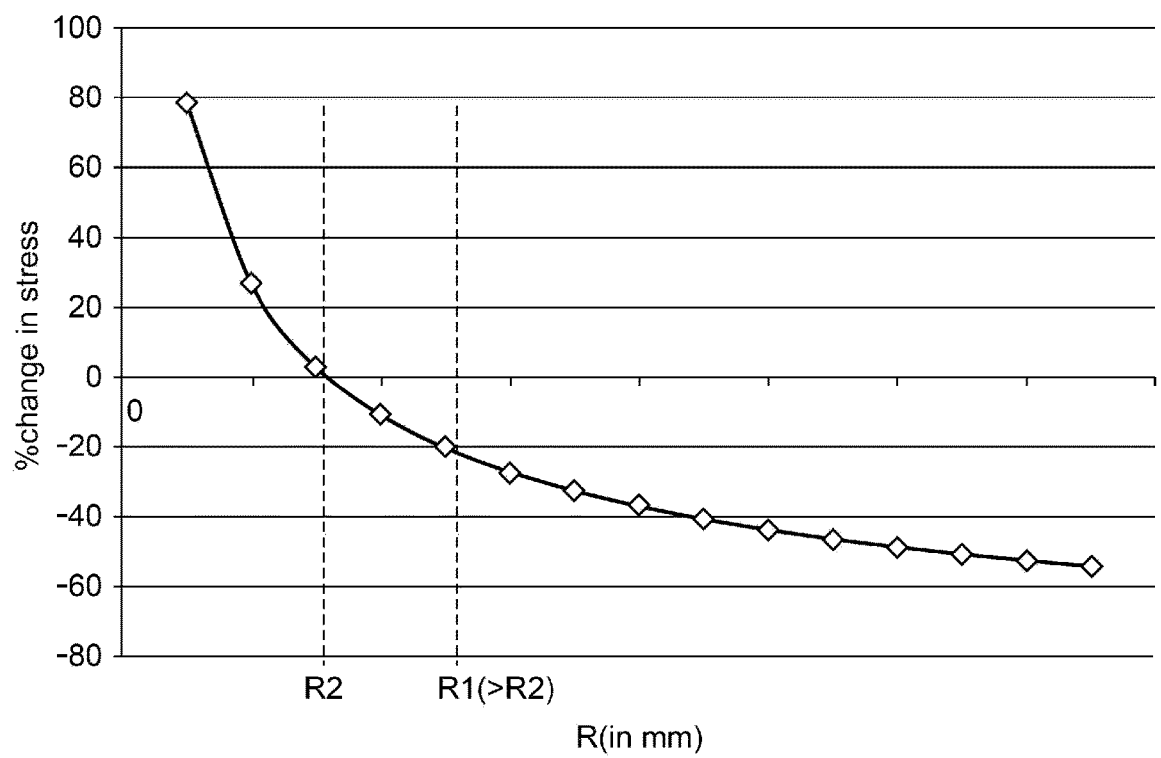
FIG. 9 is a graph showing the relationship between the radius of an approximate circle approximate to a protruding curved surface portion and the amount of change in stress.

FIG. 9 is a graph showing the relationship between the radius of an approximate circle approximate to the protruding curved surface portion and the amount of change in stress. In FIG. 9, x-axis is the radius of an approximate circle approximate to the protruding curved surface portion (drive-ring-side protruding curved surface portion 68 or first-side roll surface 76A), and y-axis is the amount of change in stress applied to the contact area CA between the lever plate 7 and the drive ring 6 versus radius R2. The radius R1 of the drive-ring-side protruding curved surface portion 68 is greater than the radius R2 of the first-side roll surface 76A, and thus it is possible to reduce the stress applied to the contact area CA between the lever plate 7 and the drive ring 6 with the drive-ring-side protruding curved surface portion 68 by approximately 20%, compared to the stress applied to the contact area CA at the radius R2.

With the above configuration, the lever plate 7 has the lever-plate-side linear portion 78 extending linearly, and the drive ring 6 has the drive-ring-side protruding curved surface portion 69 extending in the shape of a protruding curve. As described above, the turning radius TR1 of the drive ring 6 is greater than the turning radius TR2 of the lever plate 7, and thus it is possible for the drive-ring-side protruding curved surface portion 68 to have a milder shape at the protruding curved surface portion, compared to a case where the drive ring 6 has a linearly extending linear portion (first-side guide surface 66A) and the lever plate 7 has a protruding curved surface portion extending in the shape of a protruding curved surface shape (first-side roll surface 76A) as in the above comparative example. With the drive-ring-side protruding curved surface portion 68 having a mild shape, it is possible to reduce the stress applied to the contact area CA between the lever plate 7 and the drive ring 6. By reducing the stress applied to the contact area CA, it is possible to suppress wear of the engagement portion 60 between the lever plate 7 and the drive ring 6 (including the engaging portion 71 and the receiving portion 61).

In some embodiments, the lever-plate side linear portion 78 of the above described variable nozzle device 1 is, as depicted in FIG. 5 for instance, configured to extend along the longitudinal-direction axis LL of the lever plate 7. In this case, the lever-plate-side linear portion 78 extends along the longitudinal-direction axis LL of the lever plate 7, and thus it is possible to reduce stress applied to the contact area CA between the lever plate 7 and the drive ring 6. Thus, it is possible to suppress wear of the lever plate 7.

In some embodiments, the drive-ring-side protruding curved surface portion 68 of the above described variable nozzle device 1 is, as depicted in FIG. 6, configured such that the distance to the tangent T1 to the limit contact position PR1 at the radially outer side in the range AR1 which makes contact with the first-side roll surface 76 gradually increases toward the radially inner side. In this case, when the drive ring 6 rotates toward the first side in the circumferential direction, the contact area CAR of the drive-ring-side protruding curved surface portion 68 with respect to the first-side roll surface 76 (including the lever-plate-side linear portion 78) moves toward the radially inner side, in the same direction as the contact area CAL of the first-side roll surface 76 with respect to the drive-ring-side protruding curved surface portion 68. If the above contact area CAL is configured to move toward the radially outer side while the contact area CAR moves toward the radially inner side as depicted in FIG. 6 of Patent Document 1, the friction drag increases at the contact area CA between the drive-ring-side protruding curved surface portion 68 and the first-side roll surface 76. Thus, it is possible to reduce the friction drag at the contact area CA between the drive-ring-side protruding curved surface portion 68 and the first-side roll surface 76. Accordingly, by reducing the friction drag at the contact area CA, it is possible to suppress wear of the engagement portion 60 between the lever plate 7 and the drive ring 6.

In some embodiments, as depicted in FIG. 6, the above described drive-ring-side protruding curved surface portion 68 is configured such that the curvature radius gradually decreases toward the radially inner side. In the embodiment depicted in FIG. 6, the curvature radius is the largest at the limit contact position PR1 at the radially outer side, and the curvature radius is the smallest at the limit contact position PR2 at the radially inner side. In this case, it is possible to effectively reduce the friction drag at the contact area CA between the drive-ring-side protruding curved surface portion 68 and the first-side roll surface 76. By reducing the friction drag at the contact area CA effectively, it is possible to suppress wear of the engagement portion 60 between the lever plate 7 and the drive ring 6.

In some embodiments, the second-side guide surface 67 of the above described variable nozzle device 1 includes, as depicted in FIG. 7, a drive-ring-side linear portion 69 extending linearly in the range AR2 which makes contact with the above described second-side roll surface 77. The above described second-side roll surface 77 includes a lever-plate side protruding curved surface portion 79 extending in the shape of a protruding curve in the range AL2 which makes contact with the above described second-side guide surface 67.

Figure 10:
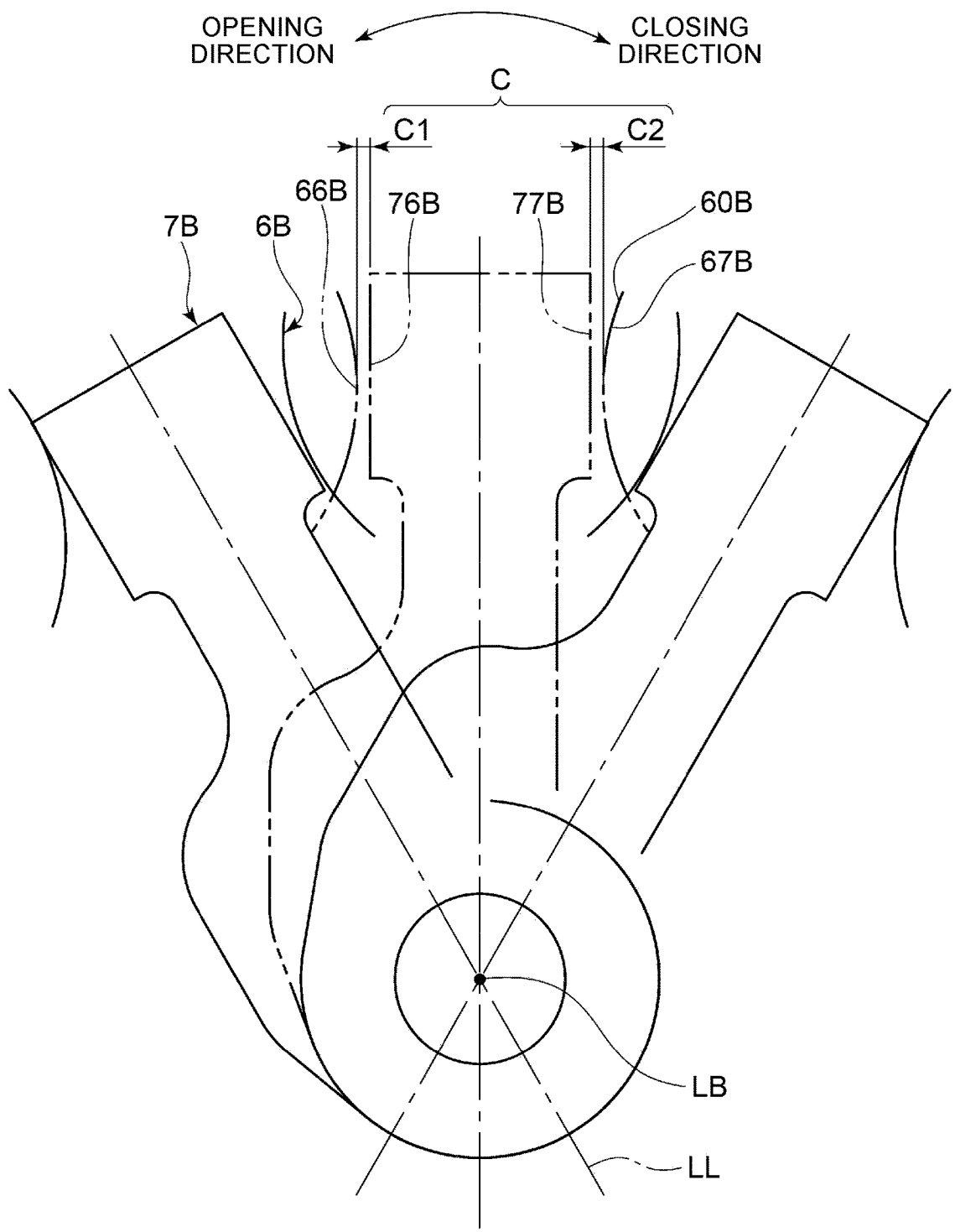
FIG. 10 is a schematic diagram for describing the relationship between a drive ring and a lever plate in the second comparative example.

FIG. 10 is a schematic diagram for describing the relationship between a drive ring and a lever plate in the second comparative example.

In the second comparative example, the first-side roll surface 76B and the second-side roll surface 77B of the lever plate 7A each extend linearly. In the second comparative example, the first-side guide surface 66B and the second-side guide surface 67B of the drive ring 6B each extend in the shape of a protruding curved surface. In this case, the clearance C of the engagement portion 60B between the lever plate 7B and the drive ring 6B depicted in FIG. 10 is greater than the clearance C3 of the engagement portion 60 between the lever plate 7 and the drive ring 6 depicted in FIG. 6. Herein, the above clearance C is the sum of the clearance C1 between the first-side guide surface 66B and the first-side roll surface 76B and the clearance C2 between the second-side roll surface 77B and the second-side guide surface 67B. Furthermore, the above clearance C3 is the sum of the clearance between the first-side guide surface 66 and the first-side roll surface 76 and the clearance between the second-side roll surface 77 and the second-side guide surface 67.

When the clearance at the engagement portion 60 between the lever plate 7 and the drive ring 6 is large, the engaging portion 71 of the lever plate 7 rocks and moves considerably due to vibration and collides repeatedly with the receiving portion 61 of the drive ring 6, and thus it is desirable for the clearance C3 of the engagement portion 60 to be small. With the above configuration, the lever plate 7 has the lever-plate-side linear portion 78 at the first side, and the lever-plate-side protruding curved surface portion 79 at the second side. The drive ring 6 has the drive-ring-side protruding curved surface portion 68 at the first side, and the drive-ring-side linear portion 69 at the second side. In this case, it is possible to reduce the maximum value of the clearance C3 of the engagement portion 60 between the lever plate 7 and the drive ring 6, compared to a case in which the lever plate 7B has a linear portion at each of the first side and the second side (the first-side roll surface 76B and the second-side roll surface 77B) and the drive ring 6B has a protruding curved surface portion at each of the first side and the second side (the first-side guide surface 66B and the second-side guide surface 67B) as depicted in FIG. 10. With the above configuration, it is possible to reduce the maximum value of the clearance C3 of the engagement portion 60, and thus it is possible to suppress wear of the engagement portion 60 due to vibration.

Figure 11:
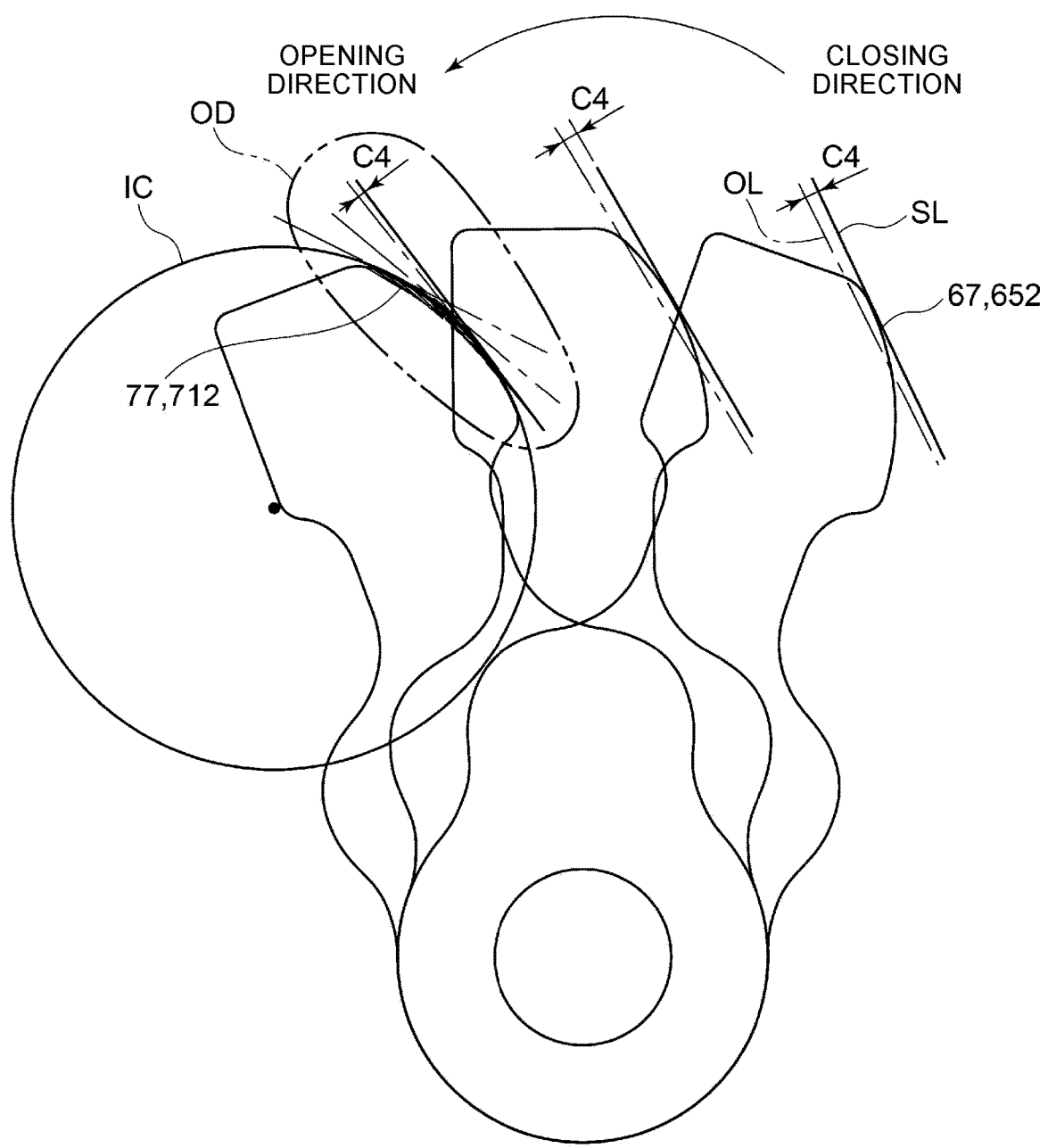
FIG. 11 is a schematic diagram for describing the shape of a lever-plate-side protruding curved surface portion.

FIG. 11 is a schematic diagram for describing the shape of a lever-plate-side protruding curved surface portion.

In some embodiments, the above described lever-plate-side protruding curved surface portion 79 has a shape specified as follows. Firstly, the shape of the drive-ring-side linear portion 69 is drawn as a straight line SL. A straight line OL is drawn from the straight line SL so as to offset by the clearance C4 toward the longitudinal-direction axis LL. Herein, the clearance C4 is the clearance required for the drive ring 6 to rotate. Then, a straight line group OD is provided, which includes straight lines OL corresponding to respective motion states from fully open to fully closed, combined and overlapped. With respect to the straight lines OL overlapped in the straight line group OD, an inscribed circle IC which internally contacts the overlapped lines OL from the side where the longitudinal-direction axis LL is positioned is drawn. The arc shape of the inscribed circle IC serves as the shape of the lever-plate-side protruding curved surface portion 79. In this case, with the shape of the lever-plate-side protruding curved surface portion 79 being an arc of the inscribed circle IC, it is possible to set the clearance at the engagement portion 60 between the lever plate 7 and the drive ring 6 to the clearance C4 (the clearance required for the drive ring 6 to rotate). With the above configuration, it is possible to set the maximum value of the clearance C3 of the engagement portion 60 (see FIG. 6) to the clearance C4, and thus it is possible to suppress wear of the engagement portion 60 due to vibration.

In some embodiments, as depicted in FIG. 7, the above described drive-ring-side linear portion 69 is oblique such that the distance to the longitudinal-direction axis LL of the lever plate 7 is shorter at the radially outer side than at the radially inner side. The above described lever-plate-side protruding curved surface portion 79 is configured such that the distance to the tangent T2 to the limit contact position PL3 at the radially outer side in the range AL2 which makes contact with the second-side guide surface 67 gradually increases toward the radially inner side.

With the above configuration, the drive-ring-side linear portion 69 is oblique such that the distance to the longitudinal-direction axis LL is shorter at the radially outer side than at the radially inner side. Furthermore, the lever-plate-side protruding curved surface portion 79 is configured such that the distance to the tangent T2 to the limit contact position PL3 at the radially outer side in the range AL2 which makes contact with the second-side guide surface 67 gradually increases toward the radially inner side. In this case, when the drive ring 6 rotates toward the second side in the circumferential direction, the contact area CAL of the lever-plate-side protruding curved surface portion 79 with respect to the second-side guide surface 67 (including the drive-ring-side linear portion 69) moves toward the radially inner side, the same direction as the contact area CAR of the second-side guide surface 67 with respect to the lever-plate-side protruding curved surface portion 79. Thus, it is possible to reduce the friction drag at the contact area CA between the lever-plate-side protruding curved surface portion 79 and the second-side guide surface 67. By reducing the friction drag at the contact area CA, it is possible to suppress wear of the engagement portion 60 between the lever plate 7 and the drive ring 6.

Figure 12:
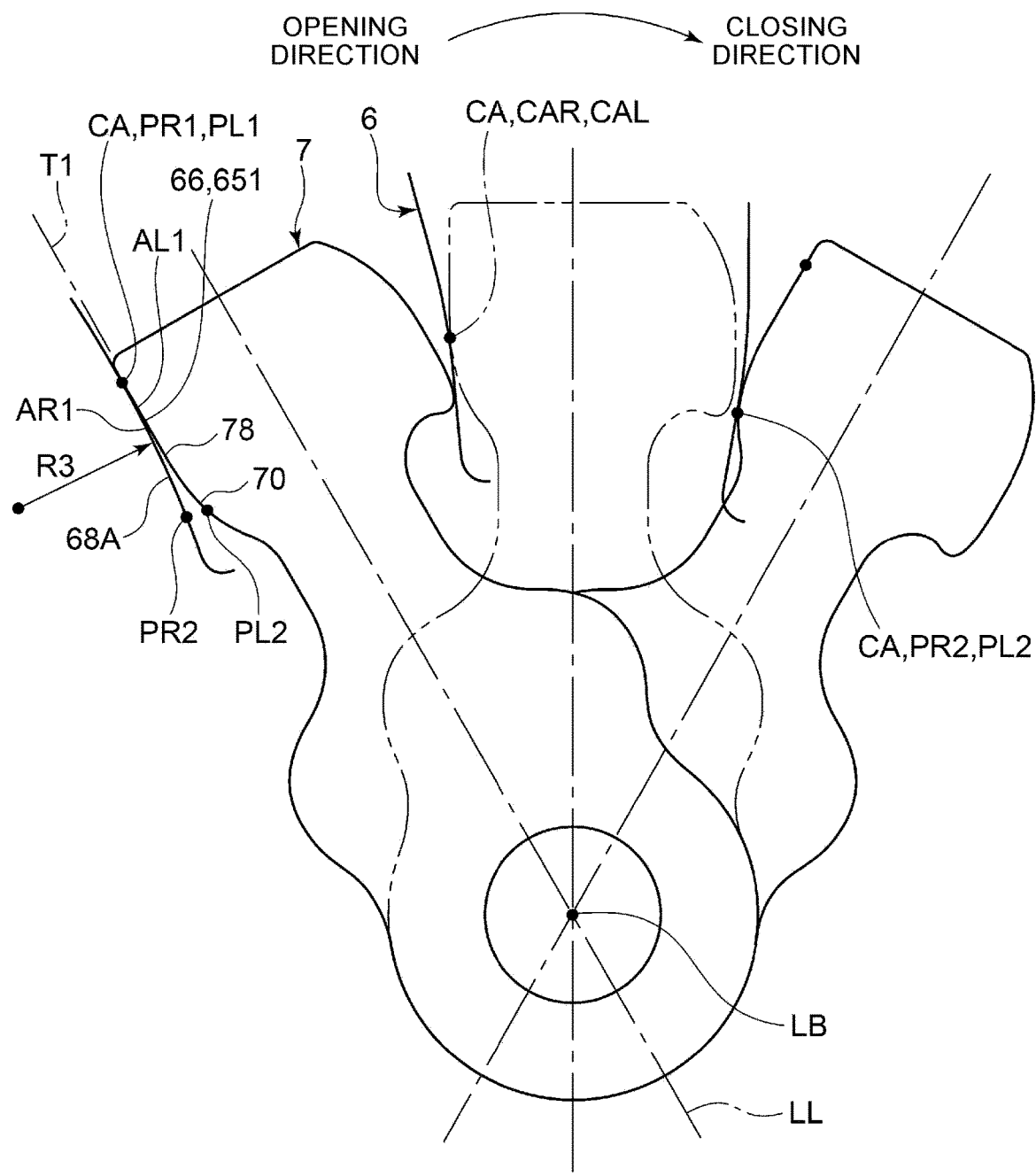
FIG. 12 is a schematic diagram for describing the relationship between a drive ring and a lever plate according to the second embodiment of the present invention.

FIG. 12 is a schematic diagram for describing the relationship between a drive ring and a lever plate in the second embodiment of the present invention.

In some embodiments, the above described first-side roll surface 76 further includes an inner protruding curved surface portion 70 which continues to the radially inner side with respect to the above described lever-plate-side linear portion 78 and which extends in the shape of a protruding curved shape in the range AR1 which contacts the first-side guide surface 66. That is, the first-side roll surface 76 includes the lever-plate-side linear portion 78 and the inner protruding curved surface portion 70. The above described inner protruding curved surface portion 70 is configured such that the distance to the longitudinal-direction axis LL of the lever plate 7 gradually decreases toward the radially inner side. In this case, it is possible for the first-side guide surface 66 to have a milder shape.

In the illustrated embodiment, the above described first-side guide surface 66 includes a drive-ring-side protruding curved surface portion 68A extending in the shape of a protruding curved surface over the entire range of the range AR1. As depicted in FIG. 12, R3 is the radius (curvature radius) of an approximate circle approximate to the range AR1 of the drive-ring-side protruding curved surface portion 68A. The radius R3 of the drive-ring-side protruding curved surface portion 68A is greater than the radius R1 of the drive-ring-side protruding curved surface portion 68, and thus it is possible to reduce the stress applied to the contact area CA between the lever plate 7 and the drive ring 6, compared to the stress applied to the contact area CA at the radius R1.

With the above configuration, the first-side roll surface 76 further includes the above described lever-plate-side linear portion 78, and the inner protruding curved surface portion 70 which continues to the radially inner side with respect to the above described lever-plate-side linear portion 78 and which extends in the shape of a protruding curved shape in the range AR1 which contacts the first-side guide surface 66. The inner protruding curved surface portion 70 is configured such that the distance to the longitudinal-direction axis LL of the lever plate 7 gradually decreases toward the radially inner side. Thus, the drive-ring-side protruding curved surface portion 68A makes contact with the lever-plate-side linear portion 78 and the inner protruding curved surface portion 70 when the drive ring 6 rotates. In this case, it is possible for the drive-ring-side protruding curved surface portion 68A to have a milder shape compared to a case in which the first-side roll surface 76 includes only the lever-plate-side linear portion 78. With the drive-ring-side protruding curved surface portion 68A having a mild shape, it is possible to reduce the stress applied to the contact area CA between the lever plate 7 and the drive ring 6, and thereby suppress wear of the engagement portion 60 between the lever plate 7 and the drive ring 6.

In some embodiments, as depicted in FIG. 6, the first-side guide surface 66 and the first-side roll surface 76 of the above described variable nozzle device 1 are each configured to make contact with one another when the drive ring 6 rotates in the closing direction. When the drive ring 6 is rotated in the closing direction, the nozzle vane 5 reduces the flow-passage cross-sectional area of the nozzle flow passage 32C, which increases the pressure applied to the nozzle vane 5 from exhaust gas flowing through the nozzle flow passage 32C. Thus, the stress applied to the contact area CA between the lever plate 7 and the drive ring 6 is large compared to that in rotation of the drive ring 6 in the opening direction. With the above configuration, the first-side guide surface 66 and the first-side roll surface 76 are each configured to make contact with one another when the drive ring 6 rotates in the closing direction. In this case, it is possible to reduce the stress applied to the contact area CA upon rotation of the drive ring 6 in the closing direction, which is the rotational direction that applies a great stress to the contact area AC, and thus it is possible to effectively suppress wear of the engagement portion 60.

The exhaust turbocharger 2 (variable-geometry type exhaust turbocharger) according to some embodiments includes the above described variable nozzle device 1, as depicted in FIG. 1. In this case, the lever plate 7 has the lever-plate-side linear portion 78 extending linearly, and the drive ring 6 has the drive-ring-side protruding curved surface portion 69 extending in the shape of a protruding curve. Thus, it is possible to suppress wear of the engagement portion 60 the lever plate 7 and the drive ring 6. By suppressing wear of the engagement portion 60, it is possible to operate the nozzle vane 5 accurately for a long period of time, and thus the variable-geometry type exhaust turbocharger 2 can regulate the supercharge pressure of combustion gas supplied to the engine (engine body 26) accurately for a long period of time.

Embodiments of the present invention were described in detail above, but the present invention is not limited thereto, and various amendments and modifications may be implemented.

DESCRIPTION OF REFERENCE NUMERAL

1 Variable nozzle device
2 Exhaust turbocharger
4 Nozzle mount
5 Nozzle vane
6 Drive ring
6A, 6B Drive ring of comparative example
7 Lever plate
7A, 7B Lever plate of comparative example
8 Nozzle plate
9 Nozzle support
21 Housing
21A Turbine housing
21B Compressor housing
21C Bearing housing
22 Rotational shaft
23 Turbine wheel
24 Compressor rotor
25 Bearing
26 Engine body
27 Supply line
28 Discharge line
29 Actuator
30 Controller
31 Exhaust gas introduction port
32 Exhaust gas flow passage
32A Scroll flow passage
32B Exhaust gas discharge flow passage
32C Nozzle flow passage
33 Exhaust gas discharge port
41 Annular plate portion
42 Outer peripheral edge portion
43 Internal space
44 Radially inner portion
45 Radially outer portion
46 Radially outer end portion
51 Vane shaft
52 Vane
53 First end portion
60 Engagement portion
61 Receiving portion
62 Ring-side annular plate portion
63 Radially inner end portion
64 Outer peripheral edge portion
65 Groove portion
65 Groove portion
66 First-side guide surface
67 Second-side guide surface
68 Drive-ring-side protruding curved surface portion
69 Drive-ring-side linear portion
70 Inner protruding curved surface portion
71 Engaging portion
72 Fixed portion
73 First end portion
74 Second end portion
75 Narrow width portion
76 First-side roll surface
77 Second-side roll surface
78 Lever-plate side linear portion
79 Lever-plate side protruding curved surface portion
81 Plate-side annular plate portion
82 Inner peripheral edge portion
83 Protruding portion
AL1, AL2, AR1, AR2 Range
C, C1, C2, C3, C4 Clearance
CA, CAL, CAR Contact area
IC Inscribed circle
OD Straight line group
OL, SL Straight line
PL1, PL2, PL3, PL4, PR1, PR2, PR3, PR4 Limit contact position
R1, R2, R3 Radius
T1, T2 Tangent
TR1, TR2 Turning radius
X Axial direction
X1 First side
X2 Second side
Y Radial direction

The invention claimed is:

1. A variable nozzle device, comprising:
a nozzle mount;
a plurality of nozzle vanes supported rotatably on the nozzle mount;
a drive ring being disposed rotatably about an axis of the nozzle mount and having a plurality of receiving portions disposed at different positions along a circumferential direction; and
a plurality of lever plates each having a fixed portion to be fixed to corresponding one of the plurality of nozzle vanes and an engaging portion to be engaged with corresponding one of the plurality of receiving portions of the drive ring,
wherein the receiving portions each include a first-side guide surface and a second-side guide surface, wherein the engaging portions each include a first-side roll surface which is to be in contact with the first-side guide surface and a second-side roll surface which is to be in contact with the second-side guide surface, wherein the first-side roll surface includes a lever-plate-side linear portion extending linearly in at least a part of a range which is to be in contact with the first-side guide surface, and wherein the first-side guide surface includes a drive-ring-side protruding curved surface portion extending in a protruding curve shape in at least a part of a range which is to be in contact with the first-side roll surface.

2. The variable nozzle device according to claim 1, wherein the first-side roll surface includes an inner protruding curved surface portion continuing to a radially inner side with respect to the lever-plate-side linear portion, the inner protruding curved surface portion extending in a protruding curve shape in a range which is to be in contact with the first-side guide surface, and wherein the inner protruding curved surface portion is configured such that a distance to a longitudinal-direction axis of the lever plate gradually decreases toward a radially inner side.

3. The variable nozzle device according to claim 1, wherein the first-side guide surface and the first-side roll surface are each configured to be in contact with one another upon rotation of the drive ring in a closing direction.

4. The variable nozzle device according to claim 1, wherein the lever-plate-side linear portion is configured to extend along a longitudinal-direction axis of the lever plate.

5. The variable nozzle device according to claim 4, wherein the drive-ring-side protruding curved surface portion is configured such that a distance to a tangent to a limit contact position at a radially outer side in a range which is to be in contact with the first-side roll surface gradually increases toward a radially inner side.

6. The variable nozzle device according to claim 1, wherein the second-side guide surface includes a drive-ring-side linear portion extending linearly in a range which is to be in contact with the second-side roll surface, and wherein the second-side roll surface includes a lever-plate-side protruding curved surface portion extending in a protruding curve shape in a range which is to be in contact with the second-side guide surface.

7. The variable nozzle device according to claim 6, wherein the drive-ring-side linear portion is oblique such that a distance to a longitudinal-direction axis of the lever plate is shorter at a radially outer side than at a radially inner side, and wherein the lever-plate-side protruding curved surface portion is configured such that a distance to a tangent to a limit contact position at the radially outer side in a range which is to be in contact with the second-side guide surface gradually increases toward the radially inner side.

8. A variable-geometry type exhaust turbocharger including a variable nozzle device according to claim 1.

* * * * *